US008611042B2

(12) United States Patent
Schmidtke et al.

(10) Patent No.: US 8,611,042 B2
(45) Date of Patent: Dec. 17, 2013

(54) STORAGE MEDIA CARTRIDGE HANDLING APPARATUS WITH UP-DOWN DRIVE ARRANGEMENT DISENGAGEABLE WITH ACCESSOR CARRIAGE

(75) Inventors: Gregg S. Schmidtke, Fort Collins, CO (US); Kelly J. Reasoner, Fort Collins, CO (US); Jeff Kato, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 13/146,933

(22) PCT Filed: Jan. 29, 2009

(86) PCT No.: PCT/US2009/032383
§ 371 (c)(1),
(2), (4) Date: Jul. 29, 2011

(87) PCT Pub. No.: WO2010/087830
PCT Pub. Date: Aug. 5, 2010

(65) Prior Publication Data
US 2011/0285264 A1    Nov. 24, 2011

(51) Int. Cl.
*G11B 15/68* (2006.01)
(52) U.S. Cl.
USPC ........................................................ 360/92.1
(58) Field of Classification Search
USPC ........................................................ 360/92.1
See application file for complete search history.

(56) References Cited

U.S. PATENT DOCUMENTS

| | | | |
|---|---|---|---|
| 6,025,972 A | 2/2000 | Schmidtke et al. | |
| 6,222,699 B1 | 4/2001 | Luffel et al. | |
| 6,259,580 B1 | 7/2001 | Schmidtke et al. | |
| 6,404,585 B2 | 6/2002 | Schmidtke et al. | |
| 6,570,734 B2 | 5/2003 | Ostwald et al. | |
| 6,591,164 B1 | 7/2003 | Plutt et al. | |
| 6,956,715 B2 | 10/2005 | Mueller et al. | |
| 2003/0076618 A1 | 4/2003 | Brace et al. | |
| 2003/0210493 A1 | 11/2003 | Smith et al. | |
| 2004/0257924 A1 | 12/2004 | Studebaker et al. | |
| 2005/0007692 A1 | 1/2005 | Thompson et al. | |
| 2005/0125816 A1 | 6/2005 | Ostwald et al. | |
| 2006/0268450 A1* | 11/2006 | Nave et al. ...................... 360/92 |
| 2008/0131241 A1 | 6/2008 | King | |

FOREIGN PATENT DOCUMENTS

WO    9618997    6/1996

OTHER PUBLICATIONS

International Search Report, dated Oct. 29, 2009, from PCT/US2009/032383, 4 pages.
Korean Intellectual Property Office, International Appl. No. PCT/US2009/032383 International Search Report and Written Opinion dated Oct. 29, 2009 (13 pages).

* cited by examiner

*Primary Examiner* — Craig A. Renner (57) ABSTRACT

Storage media cartridge handling apparatus is disclosed that comprises: a frame to support first and second laterally spaced arrays of cartridge access locations extending in a front-back direction, and at least one laterally extending further array of cartridge access locations, the cartridge access locations facing inwardly of the frame; an up-down drive arrangement disengageably engageable with an accessor carriage to move the carriage up and down in a region between the first and second arrays, to access locations in the first, second and further arrays; and at least one lateral displacement path within the frame along which the carriage can exit and enter the frame laterally. A storage media cartridge library and an accessor carriage are also disclosed.

14 Claims, 10 Drawing Sheets

STORAGE MEDIA CARTRIDGE HANDLING APPARATUS WITH UP-DOWN DRIVE ARRANGEMENT DISENGAGEABLE WITH ACCESSOR CARRIAGE

TECHNICAL FIELD

This invention relates to apparatus for handling storage media cartridges.

BACKGROUND

Space in some storage environments is limited, for example in enterprise data-centres, and the provision of storage apparatus that has limited lateral and vertical dimensions is desirable. In response, some storage media cartridge libraries facilitate high-density storage, for example the ESL range of storage libraries from Hewlett-Packard Company, headquartered in Palo Alto, Calif.

SUMMARY

In accordance with the invention, there is provided storage media cartridge handling apparatus as claimed in claim 1.

Embodiments of the invention facilitate flexibility of movement of accessor carriages from and into cartridge access location support frames, and/or maintenance of a high-density cartridge storage environment, for example suitable for a data-centre rack arrangement.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Referring to FIGS. 1 to 4, storage media cartridge handling apparatus 10 comprises a frame 20 containing storage media cartridges 40 arranged in first and second arrays 41 and 42. The frame 20 also contains an array 50 of data transfer devices 51 for transferring data to and from respective media cartridges 40.

Figure 1:
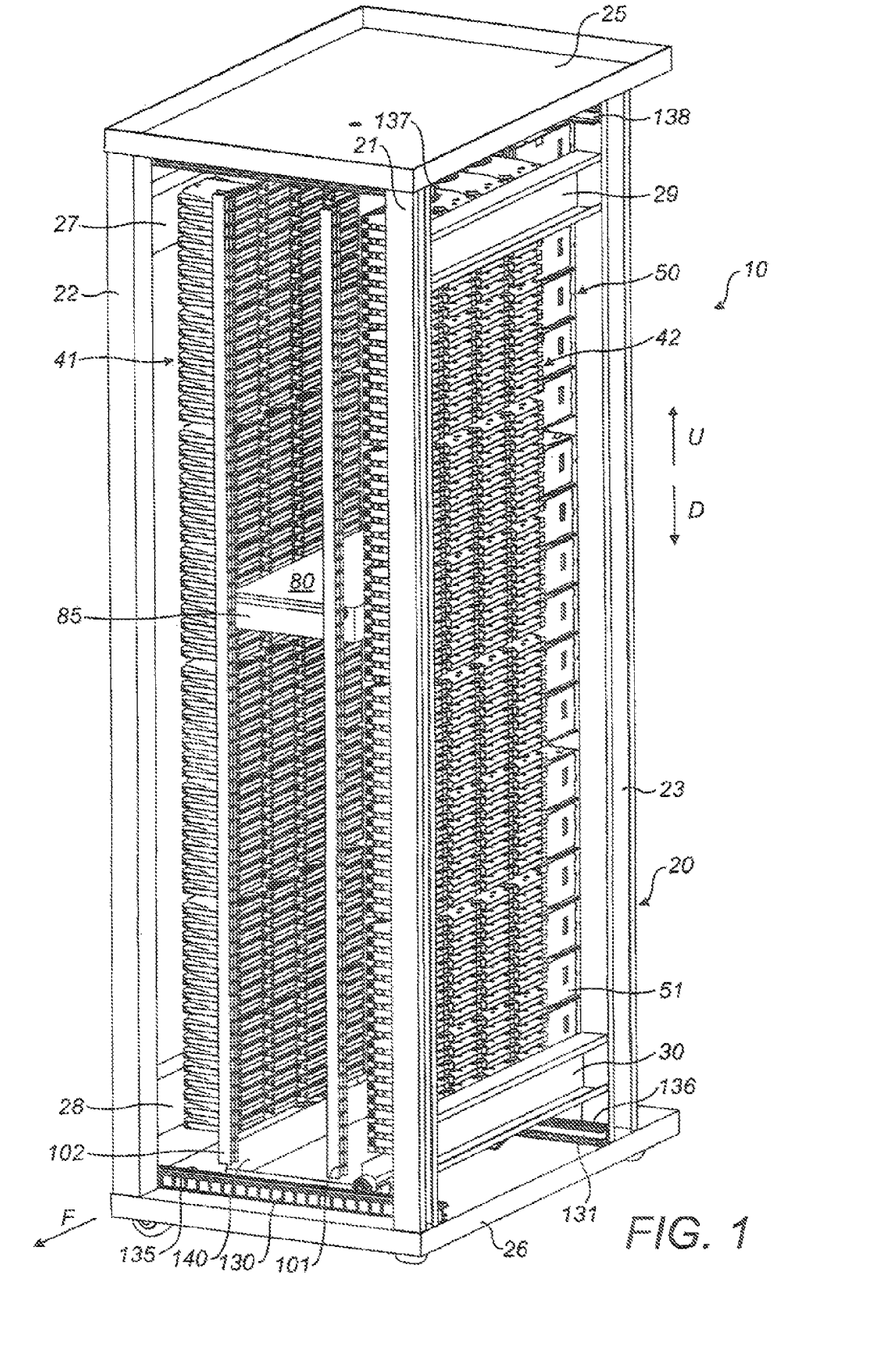
FIG. 1 is a schematic view of portions of a storage media cartridge handling apparatus from the front, top and one side, the apparatus comprising a frame containing an accessor carriage, shuttle and arrays of cartridges and data transfer devices.
Figure 2:
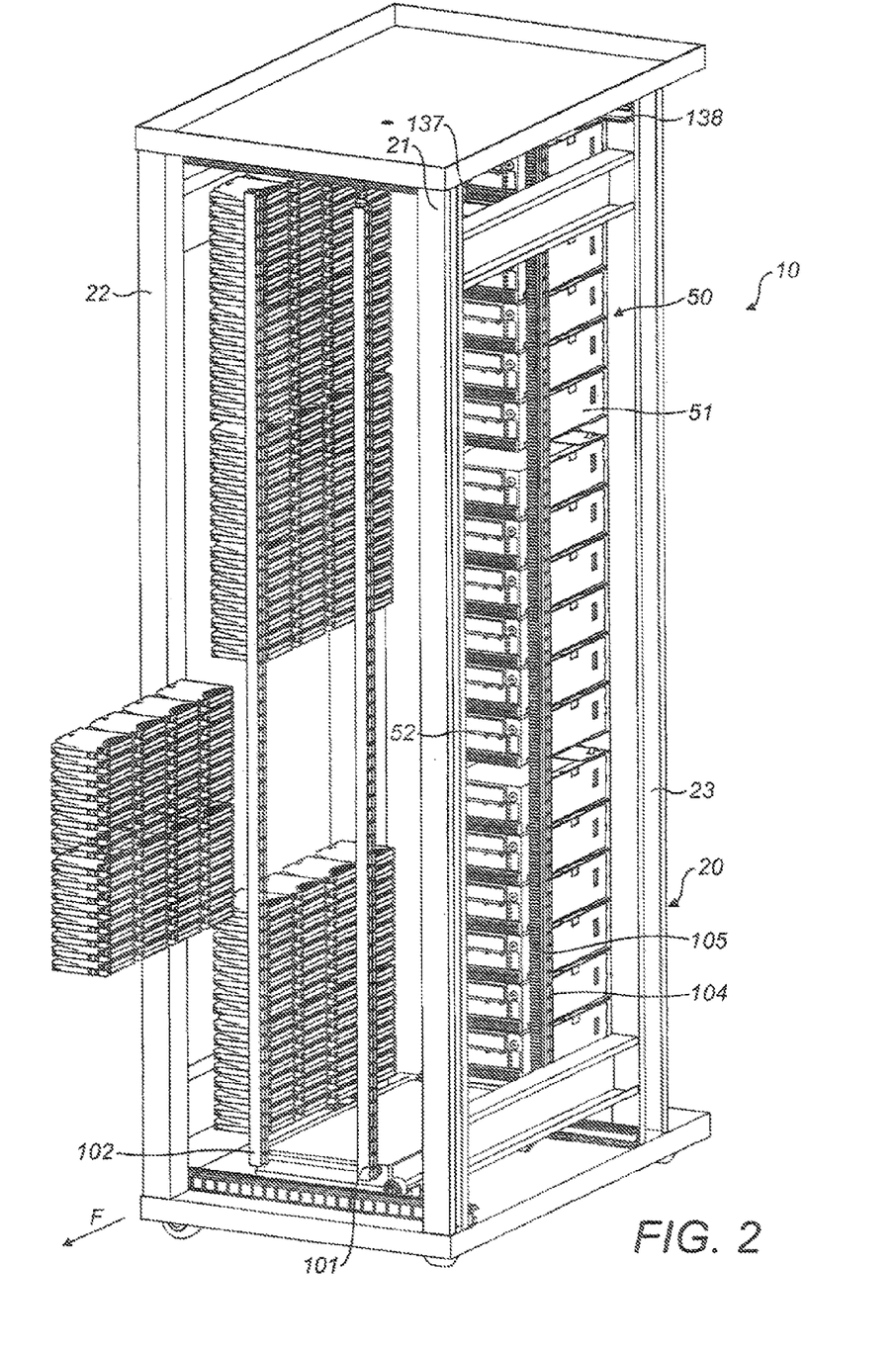
FIG. 2 shows the apparatus of FIG. 1, with fewer cartridges, and the accessor carriage loaded into the shuttle.
Figure 3:
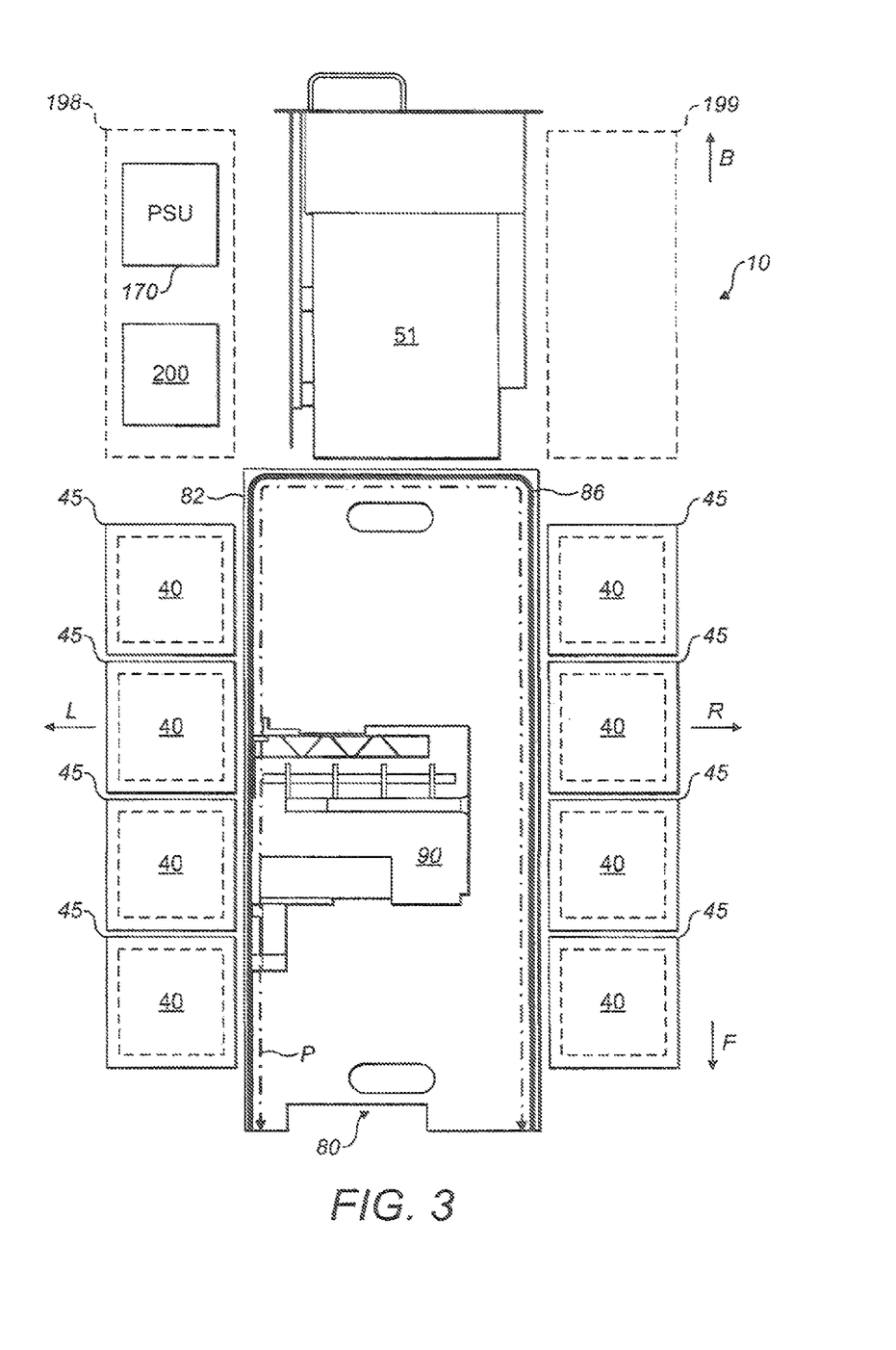
FIG. 3 is a plan view of the accessor carriage and arrays of FIG. 1, showing the accessor carriage in greater detail with top and side portions cut away.

The frame 20 comprises four substantially upright supports, three of which 21, 22, 23 are visible in FIGS. 1 and 2. Opposite end portions of the upright supports are connected to respective corner portions of respective upper and lower, substantially horizontal, end supports 25, 26, to define front, back, left and right facing side regions, respectively facing in the directions of arrows F, B, L and R as shown in FIG. 3. The frame 20 further comprises respective substantially horizontal upper and lower, left and right, side supports 27, 28, 29, and 30.

The first and second arrays 41 and 42 extend in four cartridge columns in a front-back direction and in sixty-four cartridge rows in an up-down direction. The media cartridges 40 are supported in this configuration by media cartridge storage location devices, for example in the form of magazines 45 (FIG. 3). The magazines 45 are locatable in a predetermined disposition in the frame 20, and provide at least one cell (not shown) for receiving and supporting respective media cartridges 40, the or each cell providing a respective cartridge access location in the form of an opening facing inwardly of the frame, in the directions of arrows R or L in FIG. 3. Each magazine 45 provides eight cells arranged in a single column. However, in alternative embodiments magazines providing any other convenient number of cells, in any other convenient configuration, could be employed.

The term cartridge access location is used herein to include any location having a predetermined disposition in the frame 20, where a cartridge 40 can be accessed by a cartridge accessor, and where access is provided for a cartridge 40 to be received by a cartridge receiving device such as a data transfer device 51, or a cell of a magazine 45.

An arrangement (not shown) can be provided to enable at least one of the magazines 45 to be insertable into and withdrawable from the frame in a front-back direction, as represented in FIG. 2, which illustrates eight withdrawn magazines 45 storing 64 cartridges 40. Conveniently, the arrangement is a drawer arrangement, in which at least one of the magazines 45 is slidably connected to the frame 20 to facilitate sliding insertion and withdrawal. Eight magazines 45, for example, can be attached to a sheet metal support structure (not shown) which in turn is connected to a slide mechanism (not shown) connected to the frame 20, allowing the drawer to be extended from the frame 20. The or each magazine 45 may be removably attached to the support structure.

A mechanism (not shown) can be provided to secure the drawer in the frame 20, and to release the drawer for withdrawal by an operator, for operator access to the cells of the magazine 45. Conveniently, a sensor (not shown) can be provided to sense whether the drawer is in the secured or released condition, and an indicator is provided to indicate the condition of the drawer to the operator. The number of magazines 45 that are releasably connected to the frame 20 can be varied according to perceived cartridge import-export requirements of a customer.

The array 50 of data transfer devices 51 extends in a single column in a direction laterally of the front-back direction, where the lateral direction is indicated by arrows L and R in FIG. 3, and in 18 rows in an up-down direction, indicated by arrows U and D in FIG. 1. Any convenient number of data transfer devices 51 can be provided in the frame 20 according to customer need, and in some embodiments no data transfer devices 51 are provided in a frame 20. The data transfer devices 51 are supported by the frame 20 in a known manner, for example on respective sleds (not shown) that conveniently provide power and control connections, cooling structure, and structure for orienting and referencing the data transfer devices 51 relative to the frame 20.

The media cartridges 40 are shown as tape media cartridges, and the data transfer devices 51 are shown as tape drives. However, in alternative embodiments, any other suitable types of media cartridges, or combination of types, could be used, together with at least one respective compatible data transfer device. For example, removable hard disk drive media cartridges and/or solid-state media cartridges could be employed.

Each tape drive 51 includes a slot 52 for receiving media cartridges 40 into the drive 51 in a known manner, to interface with the drive 51. The mouth of each slot 52 faces inwardly of the frame 20, in the direction of arrow F in FIG. 3, and provides a respective cartridge access location.

An accessor carriage 80 is movable up and down in a region lying generally between the first and second arrays 41, 42, and closely bordered by the first, second and further arrays 41, 42, 50. The accessor carriage 80 supports an accessor 90 for movement relative to the carriage 80 in front-back and lateral directions along a generally U-shaped path P (FIG. 3). The up-down movement of the carriage 80 and the front-back and lateral movement of the accessor 90 enable the accessor 90 to access cartridges 40 in any desired row and column of any of the arrays 41, 42, 50.

The accessor 90 includes a cartridge engaging mechanism in the form of a gripper (not shown) for engaging a cartridge 40 in a slot 52 or cell, moving the cartridge 40 into the accessor 90, moving the cartridge 40 out of the accessor 90 into another selected slot 52 or cell, and disengaging the cartridge 40 to deposit the cartridge 40 in the another slot 52 or cell. Alternatively or additionally, the accessor 90 can include, for example, an optical read and/or write device for accessing cartridge barcode labels, a wireless auxiliary memory read and/or write device for accessing cartridge auxiliary memory, data transfer device cleaning and/or maintenance functionality and/or structure to facilitate retrieval of non-functional accessor carriages 80. The accessor 90 is adapted to contain a storage media cartridge 40 in a substantially horizontal orientation. This facilitates that the maximum dimension of the carriage 80 in the up-down direction is less than the maximum dimensions of the carriage in the front-back or lateral directions.

Figure 4:
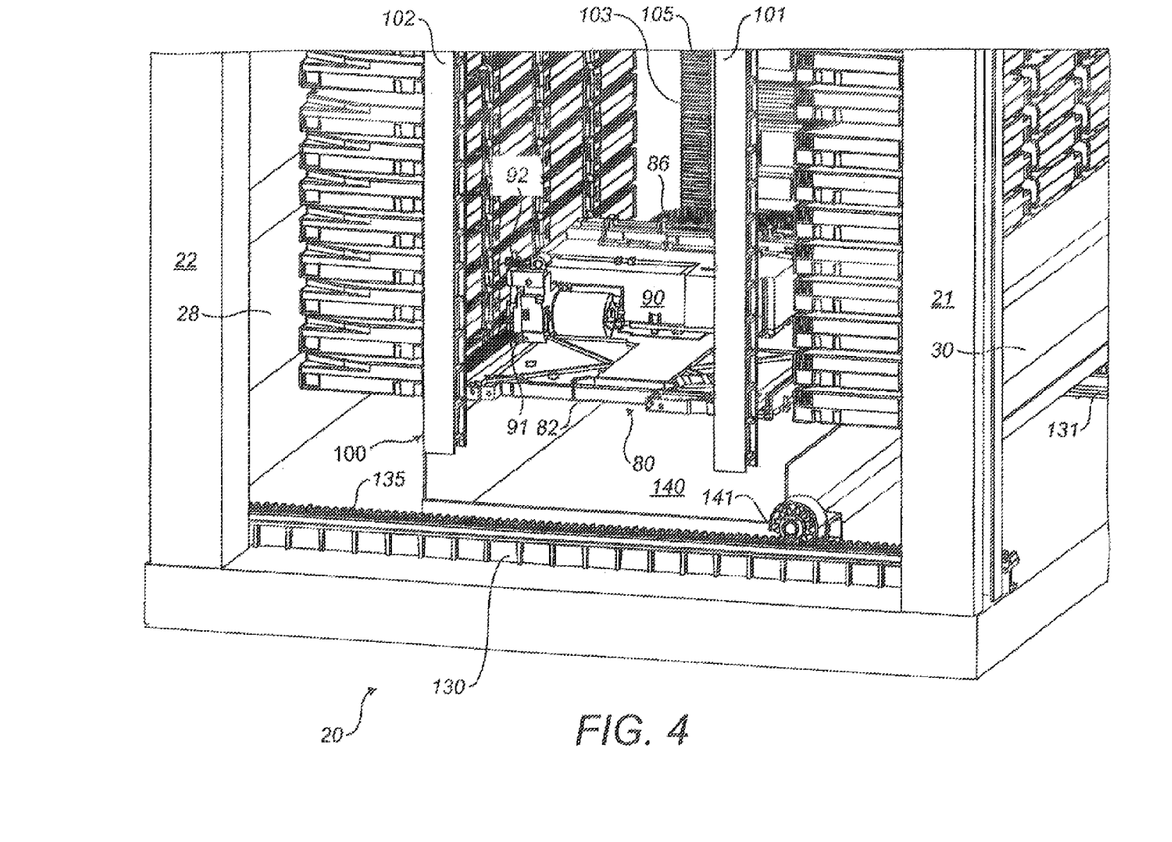
FIG. 4 shows lower portions of the apparatus of FIG. 1, from the front and one side, showing the accessor carriage in greater detail with top and side portions cut away, and a lower shuttle.
Figure 5:
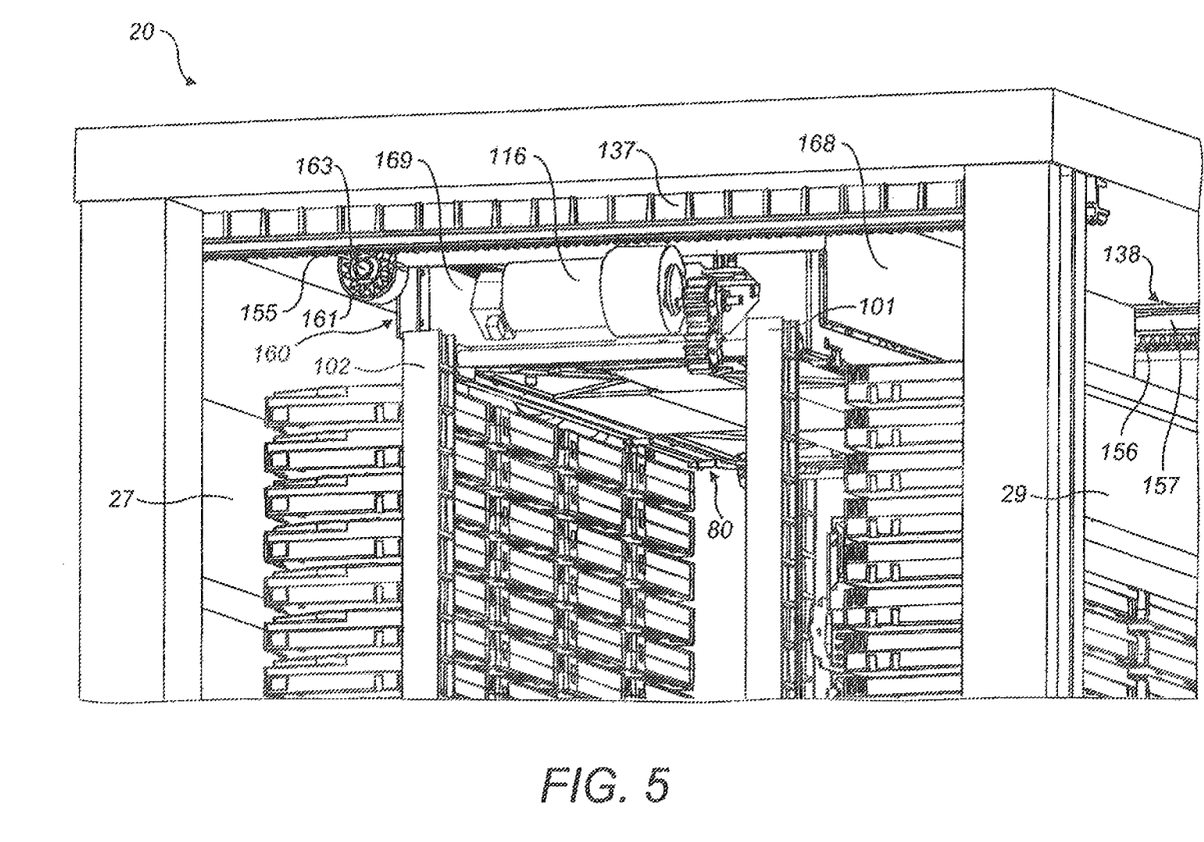
FIG. 5 shows upper portions of the apparatus of FIG. 1, from the front and one side, showing the accessor carriage loading into an upper shuttle.
Figure 6:
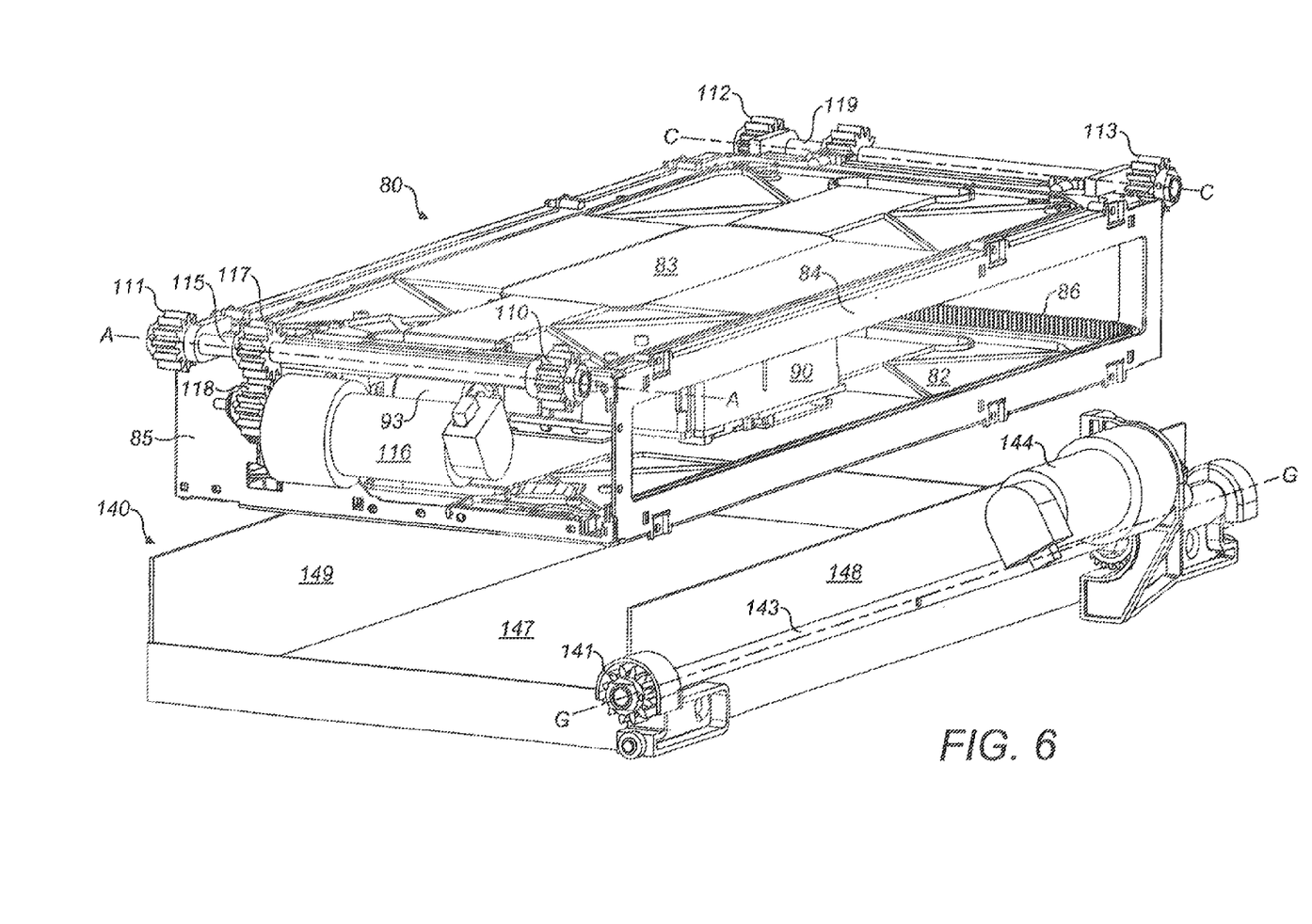
FIG. 6 shows aspects of the accessor carriage and shuttle in greater detail, from the front, top and one-side.

As best shown in FIGS. 4, 5 and 6, the accessor carriage 80 includes generally horizontally extending, vertically spaced, oppositely facing, lower and upper support structures 82 and 83, supported by four side support plates 84, 85 (two of which not shown). The three side support plates 84 that respectively face the first, second and third arrays 41, 42, 50, define openings through which the gripper (not shown) of the accessor 90 can move a cartridge 40 in a generally horizontal orientation. The lower and upper support structures 82, 83 include respective racks 86 that engage respective accessor drive pinions 91, 92 driven by on-board accessor motor 93, for driving the accessor 90 along the path P.

In alternative embodiments, cartridges 40 can be arranged in the arrays 41, 42, 50 and/or the accessor 90 in respective vertical orientations. However, horizontal cartridge arrangement facilitates minimisation of the maximum vertical extent of the or each lateral displacement path, and/or eliminates the necessity to re-orientate vertically stored cartridges into a horizontal disposition for lateral transportation.

The frame 20 is provided with an up-down drive arrangement 100 comprising four elongate up-down members 101, 102, 103, 104 in the form of respective gear racks. A longitudinal axis of each gear rack 101, 102, 103, 104 extends substantially vertically between upper and lower end portions of the frame 20. Each up-down rack 101, 102, 103, 104 is fixed relative to the frame 20 in any suitable manner, for example using at least one rigid structure (not shown), such as a sheet metal structure, extending from a top portion to a bottom portion of the frame 20 to the front of racks 101, 102 and rear of racks 103, 104, and/or extending between racks 101 and 102.

Two up-down racks 101, 102 are disposed in a front portion of the frame adjacent a forward-facing end portion of the accessor carriage 80, and have pinion-engaging faces directed rearwards (in the direction of arrow B in FIG. 3) towards the accessor carriage 80. The forward up-down racks 101, 102 are laterally spaced apart, and respectively laterally disposed adjacent opposite lateral end portions of a forward-facing side 85 of the accessor carriage 80.

This arrangement permits at least one media cartridge storage location device, for example a magazine 45 and/or drawer arrangement described above, to be loaded into the frame 20 from the front of the frame 20 through spaces lying respectively between upright support 21 and up-down rack 101 and between upright support 22 and up-down rack 102. This facilitates access from a region in front of the frame 20 for bulk loading and unloading of cartridges to and from the first and second arrays 41, 42. The arrangement also facilitates access, through a space between the forward up-down racks 101, 102, between a region in front of the frame 20 and the region of up and down movement of the carriage 80. This can facilitate, for example, hand loading of individual cartridges 40 from the front of the frame 22 to cartridge access locations in the first and second arrays 41, 42, and can be advantageous in alternative embodiments that, for example, provide accessor access to a further array of cartridge access locations disposed to the front of the frame 20, for example in a door of the apparatus 10, or that require operator access in the region of up and down movement of the carriage 80.

The other two up-down racks 103, 104 are spaced apart in the front-back direction from the up-down racks 101, 102, and are disposed in a rear portion of the frame adjacent a rear-facing end portion of the accessor carriage 80, with their respective pinion-engaging faces 105 directed forwards (in the direction of arrow F in FIG. 3) towards the accessor carriage 80. The rearward up-down racks 103, 104 are laterally spaced apart, and respectively laterally disposed adjacent opposite lateral end portions of a rear-facing side (not shown) of the accessor carriage 80. This arrangement facilitates access by the accessor 90 between the rearward up-down racks 103, 104 to cartridge access locations in the further array 50.

As best shown in FIG. 6, the accessor carriage 80 includes up-down drive engagement members in the form of accessor carriage pinions 110, 111, 112, 113. The forward accessor carriage pinions 110, 111 are fixed for rotation with a drive shaft 115 mounted at the forward-facing side 85 to the accessor carriage 80, with the axis A-A of the shaft 115 oriented in a lateral direction. The drive shaft 115 is driven by an onboard accessor carriage motor 116, through a drive train comprising gears 117 and 118. The rearward accessor carriage pinions 112, 113 are fixed for rotation with a shaft 119 mounted at the rearward-facing side to the accessor carriage 80, with the axis C-C of the shaft 119 oriented in a lateral direction. The rearward shaft 119 is also driven by the motor 116 through, for example further drive train components (not shown), for example, a spur or bevel gear train, drive belt, drive chain, or any other suitable mechanism.

In an alternative embodiment (not shown), two elongate up-down members may be provided, a forward up-down member being disposed adjacent a left-hand portion of a forward-facing side of the carriage 80, and a rearward up-down member being disposed adjacent a right-hand portion of a rearward-facing side of the carriage 80. An embodiment with one up-down member can also be envisaged. Any other suitable up-down drive arrangement could alternatively be employed.

Towards the base of the frame 20, a lateral drive arrangement is provided in the form of two elongate lateral drive members 130, 131 having respective longitudinal axes extending laterally across the width of the frame 20. Each elongate lateral drive member 130, 131 comprises a gear rack fixed relative to the frame 20. FIGS. 1, 4 and 6 include details of a lower shuttle 140. A shuttle drive shaft 143 is disposed at the right hand side of the lower shuttle 140, in the orientation shown in FIGS. 1 and 2. The shuttle drive shaft 143 has an axis G-G extending in a front-back direction of the frame 20. A lateral drive engagement member in the form of a forward shuttle drive pinion 141 is disposed at a first, forward, end portion of the shuttle drive shaft 143, and is fixed for rotation with the shuttle drive shaft 143. The forward shuttle drive pinion 141 engages an upwardly directed engagement face 135 of the foremost elongate lateral drive member 130. A further lateral drive engagement member in the form of a rearward shuttle drive pinion (not shown) is disposed at an opposite, rearward, end portion of the shuttle drive shaft 143, and is fixed for rotation with the shuttle drive shaft 143. The rearward shuttle drive pinion engages an upwardly directed engagement face 136 of the rearmost elongate lateral drive member 131. The lower shuttle 140 carries an on-board motor 144 for driving the shuttle drive shaft 143.

Further structure for facilitating lateral movement of the lower shuttle 140 can be added as desired. For example, a further front-back extending shaft that supports pinions, driven or not driven, for engaging the respective elongate lateral drive members 130, 131, can be added in a region of the left hand side of the lower shuttle 140. Additionally or alternatively, the lower shuttle 140 can be supported for lateral movement by shuttle bearing members (not shown) which engage with the lateral drive members 130, 131, for example within respective channels formed to the underside of the pinion engaging faces 135, 136 of the lateral drive members 130, 131.

As best seen in FIG. 6, the lower shuttle 140 for use on the lower lateral paths includes a generally horizontally extending base portion 147 and right and left side portions 148, 149 that extend generally in vertical and front-back directions. The lower shuttle 140 is sized to receive and support the accessor carriage 80, including the accessor 90, for lateral movement along the lateral drive members 130, 131. At least the first and second arrays 41, 42 and the lower left and right side supports 28, 30 are disposed in the frame 20 relative to the lower lateral drive arrangement 130, 131, 135, 136 such that the underside of the bottom row of cartridges 40 in each array 41, 42 and the underside of each side support 28, 30 are high enough to permit an accessor carriage 80 of predetermined maximum height to be carried in the lower shuttle 140 on respective displacement paths under the first array 41 and the lower left side support 28, and under the second array 42 and the lower right side support 30, along the lateral drive members 130, 131.

In an alternative embodiment, at least one lateral drive engagement member is provided on the accessor carriage 80, and no shuttle is necessary. For example, the carriage 80 could be provided with lateral drive engagement members in the form of pinions driven by a drive shaft having a front-back extending axis. In a further example, the up-down gear racks 101, 102, 103, 104 could be disposed in the frame 20 with laterally inwardly facing pinion-engaging faces, and drive engagement members, in the form of pinions driven by a drive shaft having a front-back extending axis, could be used for providing both up-down and lateral movement of the carriage 80. Drive could be taken, for example, from a dedicated motor on board the carriage 80, or from a drive train connected to another on-board motor, for example motor 116.

Figure 8:
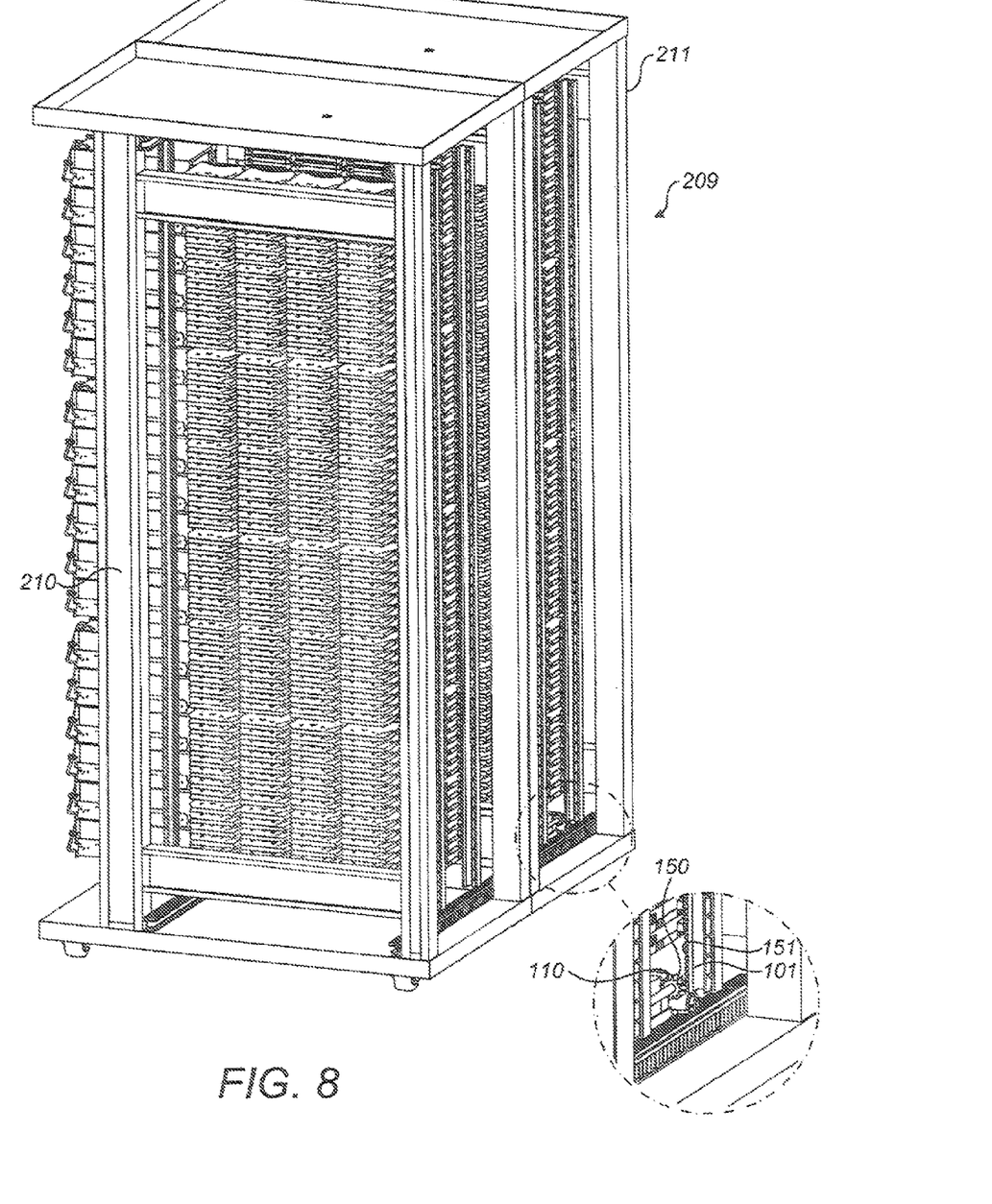
FIG. 8 is a schematic view, from the front, top and an opposite side, of the apparatuses of FIG. 7, including detail of the accessor carriage moving into engagement with an up-down drive arrangement of one of the apparatuses.

Lower distal end portions of the up members 101, 102, 103, 104 extend downwardly into a region below the underside of the bottom row of cartridges 40 in each array 40, 41 and the underside of each side support 28, 30, adjacent the lower lateral displacement paths. This permits the carriage 80 to move downwardly into the region of the lower lateral displacement paths and into the lower shuttle 140, where the up-down drive engagement members 110, 111, 112, 113 can disengage from the up-down drive arrangement 101, 102, 103, 104 and permit lateral movement of the carriage 80. As best shown in the detail of FIG. 8, lateral movement of the accessor carriage 80 along the lateral displacement path, into or out of alignment with the region of carriage up and down movement, causes the generally laterally extending teeth 150 of the up-down pinions 110, 111, 112, 113 to engage with or disengage from the generally laterally extending teeth 151 at distal ends of the respective up-down racks 101, 102, 103, 104.

As best seen in FIG. 5, towards the top of the frame 20, an upper lateral drive arrangement is provided in the form of two elongate upper lateral drive members 137, 138 having respective longitudinal axes extending laterally across the width of the frame 20. Each elongate lateral drive member 137, 138 comprises a gear rack fixed relative to the frame 20. For use on the upper lateral paths, an upper shuttle 160 is provided. The upper shuttle 160, similarly to the lower shuttle 140, includes a generally horizontally extending base portion and right and left side portions 168, 169 that extend generally in vertical and front-back directions.

The upper shuttle 160 is sized to receive and support the accessor carriage 80, including the accessor 90, as shown in FIG. 5, for lateral movement along the upper lateral drive members 137, 138. The upper shuttle 160 is oriented in the frame 20 with the shuttle side portions 168, 169 extending downwardly from the shuttle base portion, so that the upper shuttle 160 opens downwardly for receiving a carriage 80 as the carriage 80 moves upwardly in the frame 20. The upper shuttle 160 is provided with a retainer (not shown), for retaining a received carriage 80 in the upper shuttle 160 during lateral movement of the shuttle 160. For example, the retainer could comprise a retainer finger mechanism that engages a received carriage 80 to lock the carriage 80 in place in the upper shuttle 160.

The upper shuttle 160 has lateral drive engagement members in the form of shuttle drive pinions 161 fixed for rotation with a shuttle drive shaft 163 having an axis extending in a front-back direction of the frame 20. The shuttle drive pinions 161 engage respective downwardly directed engagement faces 155, 156 of the elongate lateral drive members 137, 138. The upper shuttle 160 can carry an on-board motor (not shown) for driving the shuttle drive shaft 163. Further structure for facilitating lateral movement of the upper shuttle 160 can be added as desired. For example, a further front-back extending shaft that supports further pinions, driven or not driven, for engaging the respective elongate lateral drive members 137, 138, can be added in a region of the right hand side of the upper shuttle 160. Additionally or alternatively, the upper shuttle 160 can be supported for lateral movement by shuttle bearing members (not shown) which engage with the lateral drive members 137, 138, for example within respective laterally extending channels 157 of the lateral drive members 137, 138, to support at least part of the weight of the upper shuttle 160 and, if loaded in the shuttle 160, carriage 80.

At least the first and second arrays 41, 42 and the upper left and right side supports 27, 29 are disposed in the frame 20 relative to the upper lateral drive arrangement 137, 138, 155, 156 such that the topside of the top row of cartridges 40 in each array 41, 42 and the topside of each side support 27, 29 are low enough to permit an accessor carriage 80 of predetermined maximum height to be carried in the upper shuttle 160 on respective upper displacement paths above the first array 41 and the upper left side support 27, and above the second array 42 and the upper right side support 29, along the lateral drive members 137, 138.

Upper distal end portions of the up-down members 101, 102, 103, 104 extend upwardly into a region above the top side of the top row of cartridges 40 in each array 40, 41 and the top side of each upper side support 27, 29, adjacent the upper lateral displacement paths. This permits the carriage 80 to move upwardly into the region of the upper lateral displacement paths and into the upper shuttle 160, where the up-down drive engagement members 110, 111, 112, 113 can disengage from the up-down drive arrangement 101, 102, 103, 104 and permit lateral movement of the carriage 80. Lateral movement of the accessor carriage 80 along the lateral displacement path, into or out of alignment with the region of carriage up and down movement, causes the generally laterally extending teeth of the up-down pinions 110, 111, 112, 113 to engage with or disengage from the generally laterally extending teeth at distal ends of the respective up-down racks 101, 102, 103, 104.

In alternative embodiments, instead of gear racks, the up-down and lateral drive arrangements can take other forms, for example, belts or endless-loops engageable by the carriage 80 or shuttle 90, guide rails engageable by friction wheels of the carriage 80 or shuttle 90, cable drives, or any other suitable arrangement.

The apparatus 10, when intended for use as a stand-alone storage media cartridge library module, or as a command module in a library comprising a plurality of the apparatuses 10, can be provided with a library controller 200 comprising a processor 201 and a memory 202 storing program instructions for processing by the processor 201. The apparatus 10 can also be provided with various ancillary devices such as power supplies 170 for the data transfer devices 51 and motors 93, 116, 144, a user interface (not shown), protective casing structure including a front door (not shown), and wired and/or wireless connectivity and interface structures (not shown) for transmitting and receiving power and command signals between various library components. According to one embodiment, the controller 200 and ancillary devices can be at least mostly disposed in regions 198, 199 to the rear of the first and second arrays 41, 42 at opposite sides of the further array 50. The controller 200 and ancillary devices are commonly associated with storage media cartridge handling apparatuses, and therefore are mostly not described in further detail herein.

Referring now to FIGS. 7 to 10, two storage media cartridge handling apparatuses 10 are interconnected in a side-by-side arrangement to form a storage media cartridge library 209. The left-hand apparatus is a command module 210 and includes a library controller 200. The right-hand apparatus is an extension module 211. It will be understood that further extension modules 211 could be provided, in side-by-side arrangement, according to user requirements. Furthermore, a plurality of accessor carriages 80 with respective accessory 90, and/or a plurality of upper and lower shuttles 140, 160 can be provided in the library 209. The extension modules 211 can be provided without library controllers and user interfaces, for example, and may vary in the number of cartridge storage locations and data transfer devices provided. For example, in some extension modules 211, no data transfer devices may be provided, and the at least one further lateral array could comprise cartridge storage cells.

Program instructions stored in memory 202, when executed by the processor 201, cause the controller 200 to perform necessary library control tasks, as directed by commands received from the library user interface (not shown) which, for example, can take the form of a local graphical user interface (GUI) or a web interface. The controller 200 includes a wireless transmitter/receiver circuit 230 for communicating with corresponding respective wireless transmitter/receiver circuits 231 and 232 of the carriages 80 and shuttles 140 which in turn are connected to logic for controlling the respective carriage, accessor, and shuttle motors 116, 93, 144. Power is provided to the independently movable carriages 80 and shuttles 140, including the motors 116, 93, 144, by on-board power sources such as batteries (not shown). The batteries can be charged in any convenient manner, for example using brush contacts to receive power through the up-down and/or lateral drive arrangements. Alternatively and/or additionally, power and/or communication can be provided directly to the carriages 80 and shuttles 140 in any suitable manner, for example by cable linkage or brush contacts.

With reference to FIGS. 7 to 10, the library controller 200 can be connected for receiving storage media cartridge library commands from a host computer 215. The controller 200 may be connected, for example, across a storage network such as a fabric 214 using Fiber Channel protocols, or in any suitable manner. The host 215 comprises a computer processor 216 and computer memory 217 running a storage application 218, and a host bus adapter 219 for connecting to the fabric 214. The host 215 can also address data transfer devices 51 across the fabric 214, for transfer of user data.

An exemplary store operation will now be described, in order to illustrate operation of the library 209. In use, the host 215 communicates to the library controller 200 that the storage application 218 wishes, for example, to store user data to a selected cartridge 40 using a selected data transfer device 51. Program instructions stored in memory 202, when executed by the processor 201, enable the controller 200 to determine the presence and location within the library 209 of the carriages 80 and shuttles 140, 160, and to control movement of the shuttles 140, 160 carriages 80 and respective accessors 90 carried by the carriages 80, so as to allocate and perform tasks required by the storage application 218 without collisions or unnecessary blocking of desired displacement routes.

Figure 10:
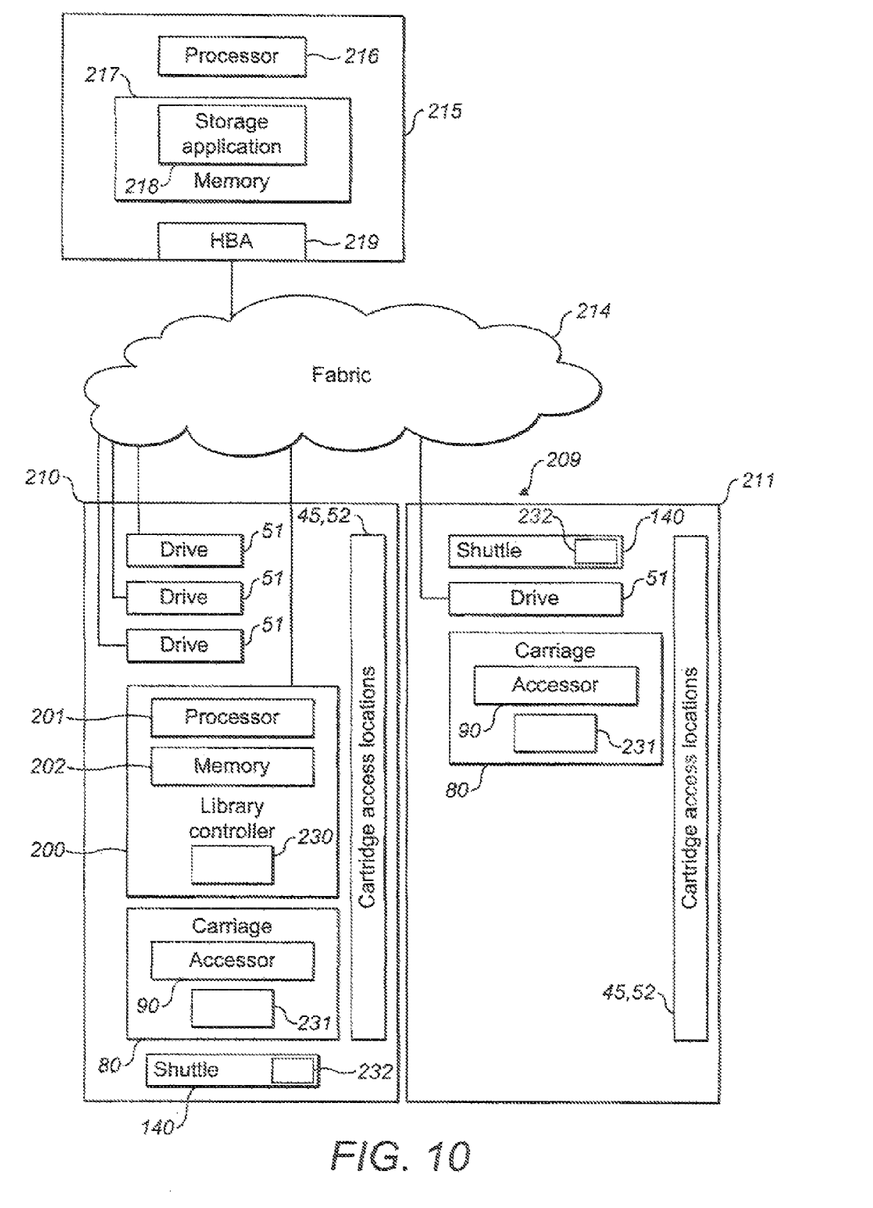
FIG. 10 is a schematic diagram illustrating control and connectivity aspects associated with a media cartridge library comprising two media cartridge handling apparatuses in side-by-side arrangement.

FIG. 10 shows, by way of example, two accessor carriages 80. The library controller 200 identifies which accessor carriage 80 is most conveniently situated to get the selected cartridge 40 from its present cartridge access location and to put the cartridge 40 in the selected data transfer device 51, and a convenient route for the carriage 80 to travel to the selected new cartridge access location.

Figure 7:
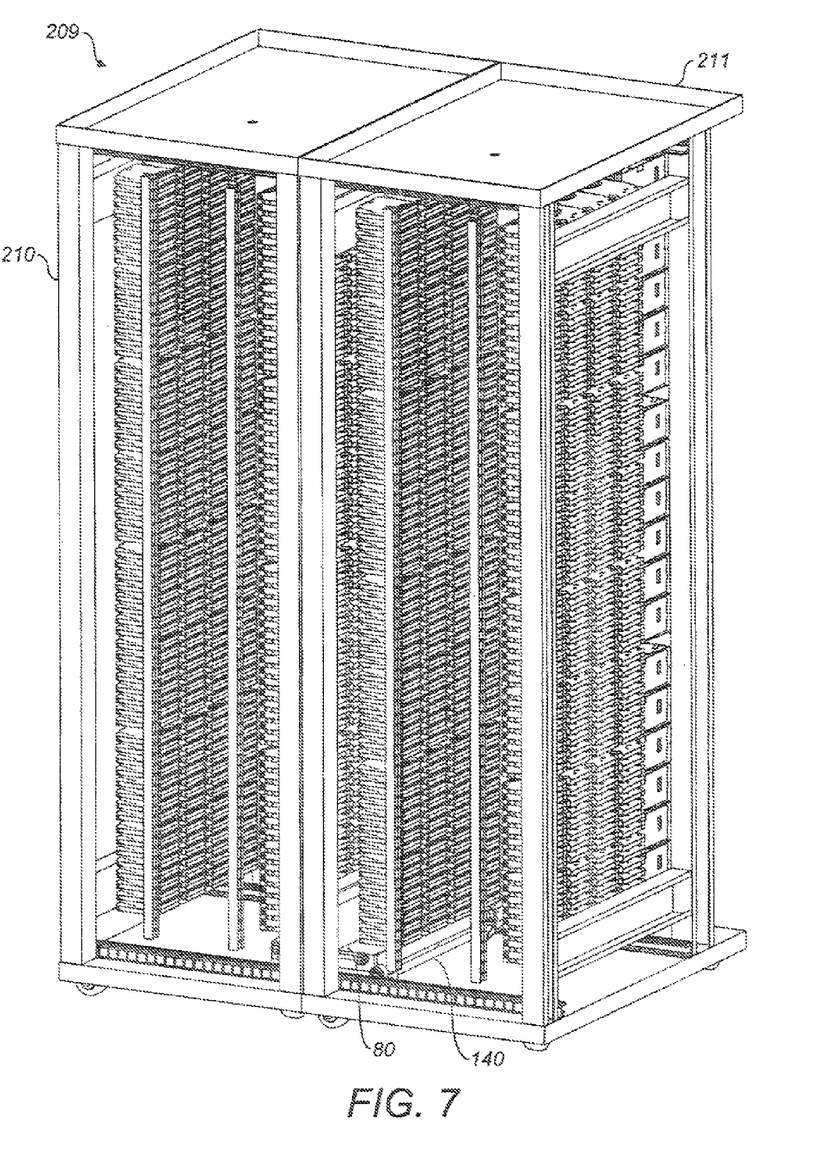
FIG. 7 is a schematic view, from the front, top and one side, showing portions of two storage media cartridge handling apparatuses interconnected in a side-by-side arrangement, with the accessor carriage loaded into the shuttle and traveling between the apparatuses along a lateral displacement path.
Figure 9:
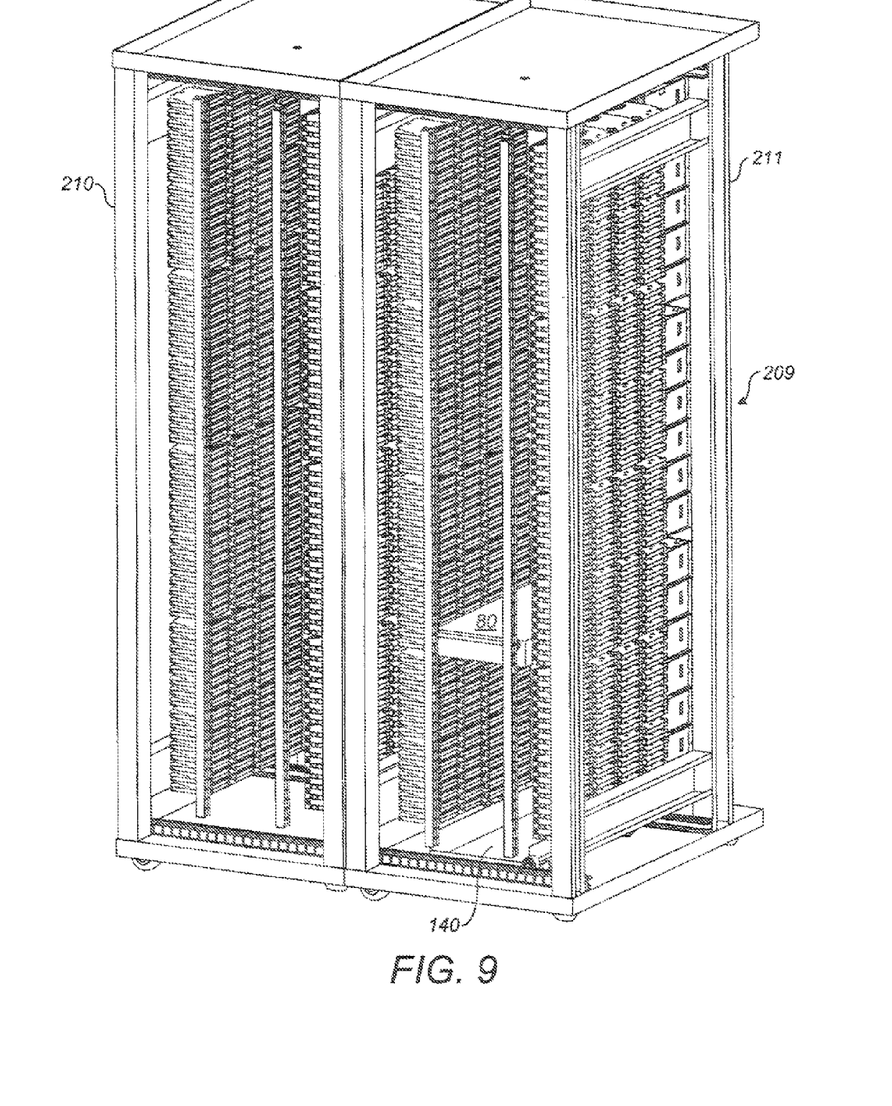
FIG. 9 is a view similar to FIG. 7, showing the shuttle aligned with an up-down drive arrangement of the right-hand apparatus, and the accessor carriage deployed in the right-hand apparatus.

If the selected cartridge 40 is presently located in a different apparatus 10 to the identified accessor carriage 80, the library controller 200 issues commands wirelessly to the carriage 80 to cause the carriage 80 to move up or down, depending on the selected route, to a distal end of the up-down drive arrangement 101, 102, 103, 104, and controls the position of an identified conveniently located upper or lower shuttle 140, 160 to receive the carriage 80, as shown in FIG. 2. The controller 200 then issues commands to move the shuttle 140, 160, loaded with the accessor carriage 80, laterally, thereby disengaging the carriage 80 from the up-down drive arrangement 101, 102, 103, 104 of the command module 210. The controller 200 controls the shuttle 140, 160 to move along the lateral displacement path (to the right as shown in FIG. 7) until the teeth 150 of pinions 110, 111, 112, 113 engage with teeth 151 of the up-down gear racks 101, 102, 103, 104 in the manner shown in FIG. 8. In response to the carriage 80 becoming engaged with the up-down drive arrangements 101, 102, 103, 104 of the extension module 211, the library controller 200 controls the up-down drive motor 116 to move the carriage 80 upwardly to the selected cartridge access location as shown in FIG. 9.

The controller 200 then controls the accessor 90 to move relative to the carriage 80 into position adjacent the selected cartridge access location, if necessary, and controls the gripper (not shown) of the accessor 90 to access the selected cartridge 40 and move the cartridge into the accessor 90. The controller 200 subsequently controls the carriage 80 to move to the selected data transfer device 51, using a further lateral displacement process if the selected data transfer device 51 is not located in the present extension module 211. The controller then controls the gripper to move the cartridge 40 into the selected data transfer device 51. When the data transfer device 51 is ready to transfer user data to the cartridge 40, the library controller 200 reports the data transfer device 51 status to the host 215, and the host 215 can begin transferring data to and/or from the cartridge 40.

Other common library tasks can be performed in an analogous manner, using the plurality of concurrently operable carriages 80 to move between frames 20 of the library 209 as necessary to minimise task latency. The use of plural carriages 80 also provides carriage redundancy, reducing the negative impact of a carriage malfunction. Also, malfunctioning carriages 80 can, if necessary, be pushed by functioning carriages 80 to a distal end of an up-down arrangement and into a shuttle 140, 160, for transport to a carriage export location of the library 209, for removal and/or replacement with minimal disruption to normal library operation.

The apparatus 10 is designed to operate in a restricted space, for example within predetermined height, width and depth restrictions in data-centre rack environment, for facilitating a high-density storage and access environment for media cartridges, with the flexibility of concurrently and independently operating accessor carriages 80. At least some embodiments described herein facilitate the provision of a storage media cartridge handling apparatus of restricted height and also high cartridge vertical stacking density, as the vertical space required for upper and lower lateral displacement path for laterally transporting the accessor carriage 80 between adjacent apparatuses 10 can be minimised. Alternatively or additionally, at least some embodiments described herein facilitate the provision of storage media cartridge handling apparatus that, when disposed in side by side arrangement, permits an accessor carriage to move directly from one described apparatus laterally into an adjacent described apparatus, without intermediary structure such as a bridge or other transport structure, which can be advantageous in a high density cartridge storage environment.

The invention claimed is:

1. Storage media cartridge handling apparatus comprising:
   a frame to support first and second laterally spaced arrays of cartridge access locations extending in a front-back direction, and at least one laterally extending further array of cartridge access locations, the cartridge access locations facing inwardly of the frame;
   an up-down drive arrangement disengageably engageable with an accessor carriage to move the accessor carriage up and down in a region between the first and second arrays, to access locations in the first, second and further arrays; and
   at least one lateral displacement path within the frame along which the accessor carriage can exit and enter the frame laterally.

2. Apparatus as claimed in claim 1, further comprising at least one lateral drive arrangement disengageably engageable with the accessor carriage to move the accessor carriage along the or each respective lateral displacement path within the frame.

3. Apparatus as claimed in claim 1, wherein the up-down drive arrangement comprises at least one elongate up-down member having a longitudinal axis extending in an up-down direction, the or each lateral displacement path passing adjacent upper and/or lower distal end portions of the or each elongate up-down member.

4. Apparatus as claimed in claim 1, wherein the up-down drive arrangement comprises at least two elongate up-down members having respective longitudinal axes spaced apart in the front-back direction.

5. Apparatus as claimed in claim 4, wherein two said elongate up-down members are laterally spaced apart and disposed adjacent a front and/or a rear portion of the region of carriage up and down movement so that the further array is accessible by an accessor of the accessor carriage through a space between the up-down members.

6. Apparatus as claimed in claim 2, wherein the or each lateral drive arrangement comprises at least one elongate lateral member having a longitudinal axis extending along the or each lateral displacement path.

7. Apparatus as claimed in claim 3, wherein the or each elongate up-down member comprises a gear rack.

8. Apparatus as claimed in claim 1, wherein the up-down drive arrangement is fixed relative to the frame.

9. Apparatus as claimed in claim 2, wherein the accessor carriage has at least one up-down drive engagement member to drivingly engage the up-down drive arrangement, and the apparatus further comprises at least one shuttle having at least one lateral drive engagement member to drivingly engage the lateral drive arrangement, the shuttle being adapted to receive the accessor carriage from the up-down drive arrangement, and to move the accessor carriage along at least one said lateral displacement path.

10. Apparatus as claimed in claim 2, wherein the accessor carriage includes:
   at least one up-down drive engagement member to drivingly engage the up-down drive arrangement; and
   at least one lateral drive engagement member to drivingly engage the lateral drive arrangement.

11. Apparatus as claimed in claim 10, wherein the or each up-down drive engagement member respectively comprises a pinion drivably connected to a motor carried by the accessor carriage, and/or the or each lateral drive engagement member respectively comprises a pinion drivably connected to a motor carried by the accessor carriage.

12. Apparatus as claimed in claim 1, wherein the up-down drive arrangement permits at least one media cartridge storage location device to be loaded into the frame from the front of the frame.

13. A storage media cartridge library comprising a plurality of apparatuses as claimed in claim 1, in side by side arrangement, a plurality of media cartridge storage location devices providing respective said first and second arrays of cartridge access locations, at least one data transfer device at least partially providing at least one said further array of cartridge access locations, a plurality of said accessor carriages carrying respective accessors, and a controller operable to control the carriages, and to move any selected carriage to any selected cartridge access location in the library.

14. A method comprising:
providing a frame to support first and second laterally spaced arrays of cartridge access locations extending in a front-back direction, and at least one laterally extending further array of cartridge access locations, the cartridge access locations facing inwardly of the frame;
providing an up-down drive arrangement disengageably engageable with an accessor carriage to move the accessor carriage up and down in a region between the first and second arrays, to access locations in the first, second and further arrays; and
providing at least one lateral displacement path within the frame along which the accessor carriage can exit and enter the frame laterally.

* * * * *